United States Patent Office 3,085,002
Patented Apr. 9, 1963

3,085,002
MOTOR FUEL COMPOSITIONS
James L. Lauer, Philadelphia, Pa., assignor to Sun Oil Company, Philadelphia, Pa., a corporation of New Jersey
No Drawing. Filed Mar. 31, 1959, Ser. No. 803,099
10 Claims. (Cl. 44—69)

This invention relates to novel motor fuel compositions containing additives which are effective in suppressing surface ignition and other deleterious deposit-induced phenomena in spark ignition internal combustion engines.

Surface ignition is the ignition of engine fuel, at times other than by normal spark initiation, by glowing or burning carbonaceous material which is deposited on engine combustion chamber surfaces. These carbonaceous deposits are principally derived from the decomposition of the fuel and/or lubricant used in the engine. Also contained in the engine deposits are products resulting from the decomposition of fuel and/or lubricant additives. The presence in engine deposits of decomposition products of organometallic anti-knock additives such as tetraethyl lead and methylcyclopentadienyl manganese tricarbonyl is especially deleterious since these products catalyze ignition of carbonaceous decomposition products at relatively low temperatures, thereby greatly increasing surface ignition in an engine. Surface ignition is deleterious in that it causes loss of power and an increase in the fuel octane requirement of the engine for knock-free performance. The audible indications of surface ignition, such as wild ping and rumble, are also undesirable in that they cause considerable annoyance and concern to the engine operator.

It has now been discovered that certain partial esters of itaconic acid are effective in suppressing surface ignition and other deposit-induced phenomena when employed in low concentration as additives in gasolines which also contain an organo-lead anti-knock agent. Specifically, the beta-monoesters of itaconic acid with low molecular weight, unsaturated, primary alcohols can be so used. Suitable alcohols are those having from 3 to about 10 carbon atoms and no more than one olefinic double bond per molecule. Specific, non-limiting examples of such alcohols include 2-propen-1-ol (allyl alcohol), 2-buten-1-ol, 3-buten-1-ol, 4-penten-1-ol, 5-hexen-1-ol and 3,7-dimethyl-7-octen-1-ol. Beta-monoallyl itaconate, i.e., the beta-monoester of itaconic acid with 2-propen-1-ol, is particularly effective and is preferred in the practice of this invention. Beta-monoallyl itaconate is a white, crystalline solid having a melting point of 100.4–102.2° F. It is characterized by the empirical formula

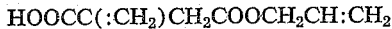
HOOCC(:CH$_2$)CH$_2$COOCH$_2$CH:CH$_2$

The above-disclosed esters of itaconic acid can conveniently be prepared by methods which are known in the art. For example, one such method comprises reacting approximately equimolar proportions of itaconic acid anhydride and the alcohol in the presence of a catalyst, such as p-toluene sulfonic acid, and in an excess of a polar solvent, such as isopropyl ether, boiling within the range of from about 120° F. to about 160° F. The reaction is conveniently conducted at the reflux temperature of the solvent for a period of from about one to about three hours. A stabilizer, such as hydroquinone, is normally required to be present in the mixture during reaction to prevent polymerization of the reaction products. After the reaction has been terminated, the reaction mass is cooled to room temperature and washed with a very small quantity of water to extract the catalyst. The solvent can then be removed by means such as distillation. Also, the stabilizer can be separated by heating the reaction products to a temperature above the melting point of the itaconate ester, but below the melting point of the stabilizer (255° F. for hydroquinone), and decanting the supernatant molten ester from the solid stabilizer. The beta-monoester of itaconic acid is obtained from the above reaction in good yield and, as produced, is of adequate purity for use in the practice of this invention.

The novel gasoline compositions of the invention comprise mainly petroleum hydrocarbons boiling in the gasoline range of from about 80° F. to about 440° F. at atmospheric pressure, and usually from about 90° F. to about 400° F. Both automotive gasoline and aviation gasoline are within the scope of this invention. Aviation gasoline has a more closely specified atmospheric boiling range, generally extending from a minium of about 100° F. to a maximum of about 350° F.

The gasoline compositions of the invention also contain an anti-knock amount of an organo-lead anti-knock compound. Tetraethyl lead (TEL) is the most commonly used organo-lead anti-knock compound, although other organo-lead compounds such as tetramethyl lead, tetraphenyl lead, tetraisopropyl lead, triethyl methyl lead, diethyl dimethyl lead, and tetra-amyl lead are sometimes used. Mixtures of these compounds can also be employed. In automotive gasoline the organo-lead anti-knock compounds are used in amounts ranging from about 0.5 to 3.0 cc. of the compound per gallon of gasoline, while in aviation gasolines a greater amount can be used, viz., up to about 6.0 cc. per gallon.

Along with the organo-lead anti-knock compound, various volatile halohydrocarbons are normally incorporated in the gasoline in lead scavenging amounts, i.e., in amounts theoretically calculated to convert the lead in the organo-lead compound to volatile compounds, viz., to lead dehalides. Examples of such halohydrocarbon lead scavengers are: organo-bromides and -chlorides such as ethylene dibromide, ethylene dichloride, acetylene tetrabromide, hexachloropropylene and mixtures thereof; mono- and poly-halopropanes, -butanes and -pentanes; polyhaloalkyl benzenes; and mixtures thereof with each other and the like. It is therefore to be clearly understood that the novel additives fo this invention can be used in leaded gasoline compositions either with or without all such lead scavengers as are commonly employed, and in such amounts as may be required. The phrase—organo-lead anti-knock "agent"—is thus intended to include such lead scavengers.

It is also to be understood that all other gasoline additives commonly employed in the art such as, for example, other anti-knock agents (e.g., cyclomatic manganese tricarbonyl anti-knock compounds), anti-icing agents, scavengers, detergents, corrosion-inhibitors, stabilizers, dyes and the like can also be employed in the novel gasoline compositions of the invention in addition to the organo-lead anti-knock compound and itaconic acid monoester.

The additives of the invention are incorporated in the gasoline composition containing the organo-lead anti-knock compound in a very small amount, which is sufficient to suppress the tendency of the engine deposits to cause surface ignition and other undesirable deposit-induced phenomena during subsequent engine operation. Generally, amounts of the additive material in the range of from about 0.005% to about 0.20% by weight of the resulting gasoline compositions, and preferably from about 0.01% to about 0.10%, give good results. The amount employed in a particular instance will normally depend upon the amount of organo-lead anti-knock compound also present in the fuel composition. On occasion however, concentrations above or below the above-recited ranges can be used.

The beta-monoesters of itaconic acid are sufficiently soluble in gasoline hydrocarbons, within the range of concentrations contemplated, so as not to require the use of mutual solvents or dispersants. Where necessary or desirable however, such mutual solvents and dispersants can be employed to incorporate amounts of the additive material in excess of its normal solubility in the gasoline composition. Normal aliphatic and aromatic hydrocarbons, chlorinated solvents, ether and other polar solvents are suitable for use as mutual solvents or dispersants and can be so employed.

In order to illustrate a specific embodiment of this invention, beta-monoallyl itaconate is prepared by reacting 5 moles of itaconic acid anhydride with 5 moles of allyl alcohol in the presence of an excess of isopropyl ether as solvent. About 10 grams of p-toluene sulfonic acid and 20 grams of hydroquinone are also present in the reaction mixture and serve the functions of catalyst and product stabilizer, respectively. The reaction is conducted for a period of about one hour at the reflux temperature of the solvent, viz., 156° F., after which the reaction mass is cooled to room temperature and the p-toluene sulfonic acid is extracted by water washing with a very small quantity of water. The reaction mass is then heated to distil off the ether and to melt the product ester. The supernatant liquid is separated from the solid stabilizer and consists essentially of beta-monoallyl itaconate, together with small amounts of the reactants.

The additive material as above-prepared is incorporated in one of two portions of a leaded, commercial, high-octane automotive gasoline in a small amount, equivalent to 0.05% by weight of the resulting gasoline composition. The commercial gasoline employed contains 3 cc. per gallon of tetraethyl lead compound, and also the customary accompanying amount of halohydrocarbon lead scavengers. The resulting composition illustrates the novel motor fuels of this invention.

The effectiveness of the additive material of this invention is demonstrated in a conventional, spark-ignition internal combustion engine, having a compression ratio of 10:1 and employing a commercially-available, high compression SAE 10W30 petroleum lubricating oil. Prior to test operation, the internal parts of this engine comprising the cylinders, pistons, valves and combustion chambers are thoroughly cleaned to remove previous engine deposits. The engine is also equipped with new spark plugs and piston rings.

The engine is first operated for a period of time equivalent to about 4,000 miles on the portion of the leaded base gasoline which does not contain the additive material of the invention, so as to build up an equilibrium quantity of representative engine deposits. The tendency of these deposits to promote audible surface-ignition phenomena is then determined by a test procedure termed the "leaded isooctane-benzene test," or L.I.B. test. This test involves operating the engine, containing the engine deposits as above produced, on a series of standard reference fuels which are mixtures of leaded isooctane and benzene in different proportions. Each such reference fuel is individually identified by a number, termed the L.I.B. number, which is numerically equal to the volumetric proportion of isooctane in that particular leaded isooctane and benzene blend. Pure leaded isooctane, with an L.I.B. number of 100, exhibits the greatest resistance to deposit-induced surface-ignition, while pure benzene, with an L.I.B. number of 0, exhibits the least. The lowest-numbered reference fuel which permits the engine to operate with only barely audible surface-ignition is termed the L.I.B. rating of the engine deposits. The lower the L.I.B. rating, the less prone are the deposits to cause audible surface-ignition phenomena.

The engine deposits resulting from operation of the engine on the leaded base gasoline without the additive material of the invention are found by the above procedure, to have an L.I.B. rating of 75.

The engine is then operated on the motor fuel composition of this invention, which contains 0.05% by weight of beta-monoallyl itaconate. After consuming only 5 gallons of the latter fuel, the engine deposits are again rated in accordance with the L.I.B. technique, and are now found to have an L.I.B. rating of only 65. The latter number represents a drop of 10 L.I.B. numbers, or a reduction of almost 15 percent in the surface-ignition tendencies of the engine deposits.

It is evident from the above that the use of the motor fuel compositions of this invention results in a significant reduction in the tendency of engine deposits derived from the base gasoline to cause surface ignition. When other embodiments of the invention are practiced as herein described, substantially equivalent results are obtained.

The invention claimed is:

1. A motor fuel composition consisting essentially of: petroleum hydrocarbons boiling within the gasoline range; an anti-knock amount of a tetra-alkyl lead anti-knock agent; and a small amount, sufficient to suppress surface ignition, of a beta-monoester of itaconic acid with an unsaturated primary aliphatic hydrocarbon alcohol having one olefinic double bond and from 3 to about 10 carbon atoms per molecule.

2. A motor fuel composition according to claim 1 wherein the tetra-alkyl lead compound in said tetra-alkyl lead anti-knock agent is tetraethyl lead.

3. A motor fuel composition according to claim 2 wherein said monoester is beta-monoallyl itaconate.

4. A motor fuel composition consisting essentially of: petroleum hydrocarbons boiling within the gasoline range; an anti-knock amount of a tetra-alkyl lead anti-knock agent; and a small amount, sufficient to suppress surface ignition, of a beta-monoester of itaconic acid with an unsaturated primary aliphatic hydrocarbon alcohol selected from the group consisting of 2-propen-1-ol, 2-buten-1-ol, 3-buten-1-ol, 4-penten-1-ol, 5-hexen-1-ol, and 3,7-dimethyl-7-octen-1-ol.

5. A motor fuel composition according to claim 4 wherein said selected alcohol is 2-propen-1-ol.

6. A motor fuel composition according to claim 4 wherein said selected alcohol is 2-buten-1-ol.

7. A motor fuel composition according to claim 4 wherein said selected alcohol is 3-buten-1-ol.

8. A motor fuel composition according to claim 4 wherein said selected alcohol is 4-penten-1-ol.

9. A motor fuel composition according to claim 4 wherein said selected alcohol is 5-hexen-1-ol.

10. A motor fuel composition according to claim 4 wherein said selected alcohol is 3,7-dimethyl-7-octen-1-ol.

References Cited in the file of this patent

UNITED STATES PATENTS

| | | |
|---|---|---|
| 1,993,737 | Graves et al. | Mar. 12, 1935 |
| 2,062,917 | Lawson | Dec. 1, 1936 |
| 2,236,590 | Backoff et al. | Apr. 1, 1941 |
| 2,922,706 | Durr et al. | Jan. 26, 1960 |

FOREIGN PATENTS

| | | |
|---|---|---|
| 640,311 | France | Mar. 26, 1928 |